United States Patent
Lindholm et al.

(10) Patent No.: US 10,716,033 B2
(45) Date of Patent: *Jul. 14, 2020

(54) SESSION TRANSFER IN A COMMUNICATION NETWORK

(71) Applicant: TELEFONAKTIEBOLAGET L M ERICSSON (PUBL), Stockholm (SE)

(72) Inventors: Fredrik Lindholm, Tokyo (JP); Ralf Keller, Würselen (DE)

(73) Assignee: TELEGONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/873,569

(22) Filed: Jan. 17, 2018

(65) Prior Publication Data

US 2018/0146399 A1  May 24, 2018

Related U.S. Application Data

(63) Continuation of application No. 14/737,573, filed on Jun. 12, 2015, now Pat. No. 9,888,409, which is a
(Continued)

(51) Int. Cl.
*H04W 36/00* (2009.01)
*H04M 15/00* (2006.01)
(Continued)

(52) U.S. Cl.
CPC ....... *H04W 36/0022* (2013.01); *H04M 15/66* (2013.01); *H04W 88/182* (2013.01); *H04W 92/045* (2013.01); *H04W 92/24* (2013.01)

(58) Field of Classification Search
None
See application file for complete search history.

(56) References Cited

U.S. PATENT DOCUMENTS 9,078,172 B2 * 7/2015 Lindholm ......... H04W 36/0022
9,888,409 B2 * 2/2018 Lindholm ......... H04W 36/0022
(Continued)

FOREIGN PATENT DOCUMENTS

| CN | 1473443 A | 2/2004 |
|---|---|---|
| CN | 101150782 A | 3/2008 |
| CN | 101682867 A | 3/2010 |
| WO | 2009011623 A1 | 1/2009 |

OTHER PUBLICATIONS

Samsung. "Bearer Identification for vSRVCC Handover Key Issue," 3GPP Draft: S2-102719 WASS2-102415. May 14, 2010.
(Continued)

*Primary Examiner* — Kouroush Mohebbi

(57) ABSTRACT

A method and apparatus for transferring a session from a packet switched access network to a circuit switched access network. A Mobility Management Entity receives a service type indicator from a gateway node. The service type indicator indicates a type of service for the session, and is associated with bearers used for the session. The Mobility Management Entity subsequently receives, from an eNodeB, an indication that the session is to be transferred from the packet switched network to the circuit switched access network. The Mobility Management Entity determines the bearers associated with the session using the service type indicator, and initiates transfer of the session using those bearers. This ensures that the correct bearers are transferred regardless of whether or not identifiers such as QCI values have been ascribed to other types of service.

8 Claims, 5 Drawing Sheets

Related U.S. Application Data continuation of application No. 13/245,320, filed on Sep. 26, 2011, now Pat. No. 9,078,172, which is a continuation of application No. PCT/EP2010/064310, filed on Sep. 28, 2010.

(51) Int. Cl.
*H04W 88/18* (2009.01)
*H04W 92/04* (2009.01)
*H04W 92/24* (2009.01)

(56) References Cited

U.S. PATENT DOCUMENTS

| | | |
|---|---|---|
| 2007/0058791 A1 | 3/2007 | Liu et al. |
| 2007/0259673 A1* | 11/2007 | Willars ............. H04W 52/0225 455/453 |
| 2009/0040993 A1 | 2/2009 | Kim et al. |
| 2009/0225719 A1 | 9/2009 | Zhi et al. |
| 2009/0232019 A1 | 9/2009 | Gupta et al. |
| 2009/0268635 A1 | 10/2009 | Gallagher et al. |
| 2010/0040020 A1* | 2/2010 | Chen ................. H04W 36/0022 370/331 |
| 2010/0322069 A1 | 12/2010 | Song et al. |

OTHER PUBLICATIONS

Samsung: "Assessment of the solutions in the bearer identification key issue". 3GPP TSG SA WG2 Meeting #80. Sep. 3, 2010. Brunstad, Norway.

3rd Generation Partnership Project; Technical Specification Group Services and System Aspects; General Packet Radio Service (GPRS) enhancements for Evolved Universal Terrestrial Radio Access Network (E-UTRAN) access (Release 10). 3GPP TS 23.401 V10.0.0 (Jun. 2010).

3rd Generation Partnership Project; Technical Specification Group Services and System Aspects; IP Multimedia Subsystem (IMS) Service Continuity; Stage 2 (Release 10). 3GPP TS 23.37 V10.2.0 (Jun. 2010).

3rd Generation Partnership Project; Technical Specification Group Services and System Aspects; Single Radio Voice Call Continuity (SRVCC); Stage 2 (Release 9). 3GPP TS 23.216 V9.4.0 (Jun. 2010).

3rd Generation Partnership Project; Technical Specification Group Services and System Aspects; Feasibility Study of Single Radio Video Call Continuity (vSRVCC); Stage 2 (Release 10). 3GPP TR 23.886 V0.3.1 (Sep. 2010).

3rd Generation Partnership Project; Technical Specification Group Services and System Aspects; IP Multimedia Subsystem (IMS); Stage 2 (Release 10). 3GPP TS 23.228 V10.1.0 (Jun. 2010).

3rd Generation Partnership Project; Technical Specification Group Services and System Aspects; Policy and charging control architecture; (Release 9). 3GPP TS 23.203 V9.5.0 (Jun. 2010).

3rd Generation Partnership Project; Technical Specification Group Services and System Aspects; General Packet Radio Service (GPRS); Service description; Stage 2 (Release 10). 3GPP TS 23.060 V10.0.0 (Jun. 2010).

3rd Generation Partnership Project; Technical Specification Group Core Network and Terminals; Mobile radio interface Layer 3 specification; Core network protocols; Stage 3 (Release 9). 3GPP TS 24.008 V9.3.0 (Jun. 2010).

* cited by examiner

SESSION TRANSFER IN A COMMUNICATION NETWORK

CROSS-REFERENCE TO RELATED APPLICATIONS

This application is a continuation of U.S. application Ser. No. 14/737,573, filed Jun. 12, 2015, granted as U.S. Pat. No. 9,888,409 B2 on Feb. 6, 2018, which is a continuation of U.S. application Ser. No. 13/245,320 filed on Sep. 26, 2011, granted as U.S. Pat. No. 9,078,172 on Jul. 7, 2015, which is a continuation of International Application No. PCT/EP2010/064310, filed Sep. 28, 2010, the disclosures of which are incorporated herein by references.

TECHNICAL FIELD

The present invention relates to the field of session transfer in a communication network.

BACKGROUND

Long Term Evolution (LTE) is a communication network technology currently under development by the 3rd Generation Partnership Project (3GPP). LTE requires a new radio access technique termed Evolved Universal Terrestrial Radio Access Network (E-UTRAN), which is designed to improve network capacity, reduce latency in the network, and consequently improve the end-user's experience. System Architecture Evolution (SAE) is the core network architecture for LTE communication networks.

LTE uses exclusively packet switched (PS) signalling. When a network operator wishes to introduce LTE, he will be unable to operate a complete LTE service from the first day. LTE will need to be rolled out gradually to replace existing technologies. In order to do this, LTE networks must have some way of interacting with networks that use other technology, such as circuit switched (CS) signalling. Single Radio Voice Call Continuity (SRVCC), described in 3GPP TS 23.237 and 3GPP TS 23.216, allows handover of a session from an LTE network to a CS network.

Referring to FIG. 1, there is illustrated a scenario in which a User Equipment (UE) 1 has an established LTE bearer with ongoing speech session over an IP Multimedia Subsystem (IMS) in a location 2 with LTE coverage. The UE 1 then moves to a second location 3 in which LTE coverage is no longer available, but a legacy CS network provides coverage. The LTE network communicates with a Mobile Switching Centre (MSC) Server 4 to indicate that the session is to be handed over from the LTE network to the CS network. The MSC server 4 notifies the IMS network 5 of the handover. The IMS network then ensures that the session can be handled by the CS network.

Similarly, handover can take place from UTRAN (HSPA) using IMS to a CS access. In the below description, the example of LTE is used, but can be replaced with HSPA.

A problem arises when, for example, a video call is to be transferred from the LTE network to a PS network. The access network is not aware that the call to be moved from PS to CS access is a video call, and so the access network cannot identify a difference between bearers used when setting up the call to carry video from a video call, or bearers used for other video applications, such as a video sharing application or a Mobile TV session.

One suggestion (described in 3GPP TR 23.886v0.3.1) for video call SRVCC assumes that the access network can determine that a video call is taking place by looking at the bearers that have been established. Each bearer is assigned a Quality of Service Class Identifier (QCI) depending on the type of media that is being transported by the bearer. If one bearer with QCI=1 (indicating voice) and another bearer with QCI=2 (indicating video) exist, then it is assumed that the call is a video call, and should be transferred as such.

A problem with this solution is that is restricts the usage of existing bearers. While QCI=2 is typically used for the video component of a video call, QCI=2 can be used for other types of video, so requiring that QCI=2 is only used for video calls creates problems with backward compatibility with existing terminals and applications that may use QCI=2 for video uses other than video calls. Furthermore, the described in 3GPP TR 23.886v0.3.1 implies that only one bearer can use QCI=2. This is because video may be streamed using different applications, each using QCI=2, and there is no way of knowing from QCI=2 which bearer relates to the video call.

A further problem is that operators may wish to use QCI values other than 2 for video calls. For example, a network operator might wish to reserve QCI=2 for mobile TV in the network. This would not be possible in the solution described in 3GPP TR 23.886v0.3.1, as the detection of a video call would wrongly assume that the mobile TV video relates to a video call.

Note that this problem is not specific to video calls, but to any type of session where more than one bearer is required for the session.

SUMMARY

According to a first aspect of the invention, there is provided a method of transferring a session from a packet switched access network to a circuit switched access network. A Mobility Management Entity (MME) receives a service type indicator from a gateway node. The service type indicator indicates a type of service for the session, and is associated with bearers used for the session. The MME subsequently receives, from an eNodeB, an indication that the session is to be transferred from the packet switched network to the circuit switched access network. The MME determines the bearers associated with the session using the service type indicator, and initiates transfer of the session using those bearers. This ensures that the correct bearers are transferred regardless of whether or not identifiers such as QCI values have been ascribed to other types of service.

As an option, the MME sends to a Mobile Switching Centre (MSC) Server an indication of the type of service to a MSC Server. The indication of the type of service allows the MSC to perform any of allocation of resources and invoking procedures relating to the type of service.

As a further option, the MME sends to a User Equipment (UE) involved in the session an indication that Single Radio Voice Call Continuity for the type of service has been invoked. In still a further option, the MME sends to the UE involved in the session an indication of the bearers associated with the session.

In an optional embodiment, prior to the MME receiving the service type indicator from the gateway node, a Policy Charging and Rules Function (PCRF), initiates bearers for the session and determines a service type. It then determines the service type indicator using the determined service type and sends the service type indicator to the gateway node for forwarding to the MME.

The service type indicated by the service type indicator is optionally selected from any of a video call, a voice call, a facsimile message, an IP Multimedia Subsystem priority message and circuit switched data, although it will be appreciated that it could be used to indicate any type of service.

As an option, the packet switched network is selected from any of a Long Term Evolution (LTE) or High Speed Packet Access (HSPA) network.

According to a second aspect, there is provided an MME for use in a communication network. The MME is provided with a first receiver for receiving from a gateway node a service type indicator, the service type indicator indicating a type of service for a session handled by the MME, the service type indicator being associated with bearers used for the session. A memory is provided for storing the received service type indicator. A second receiver is provided for receiving from an eNodeB an indication that the session is to be transferred from a packet switched access network to a circuit switched access network. A processor is also provided for determining the bearers associated with the session using the service type indicator, and initiating transfer of the session using those bearers.

As an option, the MME is also provided with a first transmitter for sending to a MSC Server an indication of the type of service. The indication of the type of service is usable by the MSC to perform actions such as allocation of resources and invoking procedures relating to the type of service.

As a further option, the MME is provided with a second transmitter for sending to a UE involved in the session an indication that Single Radio Voice Call Continuity for the type of service has been invoked and an indication of the bearers associated with the session.

According to a third aspect, there is provided a UE for use in a communication network. The UE is capable of handling a transfer of an ongoing session from a packet switched access network to a circuit switched access network. The UE is provided with a receiver for receiving from a MME a message relating to transfer of the ongoing session from the packet switched access network to a circuit switched access. The message includes an indication that Single Radio Voice Call Continuity for the type of service has been invoked, and an indication of the bearers associated with the session. A processor is also provided for determining further action on the basis of the indication that Single Radio Voice Call Continuity for the type of service has been invoked and the indication of the bearers associated with the session.

According to a third aspect, there is provided a PCRF node for use in a communication network. The PCRF node is provided with a receiver for receiving from a Call Session Control Function (CSCF) node a message relating to setting up or upgrading of a session. The message includes an indication of a type of service used in the session. A processor is provided for setting up bearers for the session and generating a service type indicator for use in a subsequent session transfer from a packet switched network to a circuit switched access network. A transmitter is also provided for sending the service type indicator to a gateway node for subsequent forwarding to a MME.

According to a fourth aspect, there is provided a P-CSCF for use in a communication network. The P-CSCF is provided with a processor for determining a type of service being used for a packet switched session and a transmitter for sending to a PCRF node a message, the message including an indication of the type of service being used. The indication of the type of service being used is subsequently usable in the event of transfer of the session to a different access network.

According to a fifth aspect, there is provided a MSC Server for use in a communication network. The MSC Server is provided with a receiver for receiving from a MME an indication of a type of service being used for a session in the event that the session is being transferred from a packet switched access network to a circuit switched access network. A processor is also provided for, on the basis of the indication, either allocating resources for the session and invoking procedures for the session.

According to a sixth aspect, there is provided a computer program, comprising computer readable code which, when run on a computer device causes the computer device to behave as any of a MME, UE, a PCRF node, a P-CSCF node and a MSC Server according as described in any of the second to fifth aspects.

According to a seventh aspect, there is provided a computer program product comprising a computer readable medium and a computer program as described above in the sixth aspect, wherein the computer program is stored on the computer readable medium.

DETAILED DESCRIPTION

The invention avoids the problems associated with relying on QCI values to identify the service type by providing a service type indicator that can be used for access transfer when a session is transferred. The following description uses an example where the type of service is a video call, although it will be appreciated that the invention can apply to other types of service, such as fax or CS data services.

Figure 1:
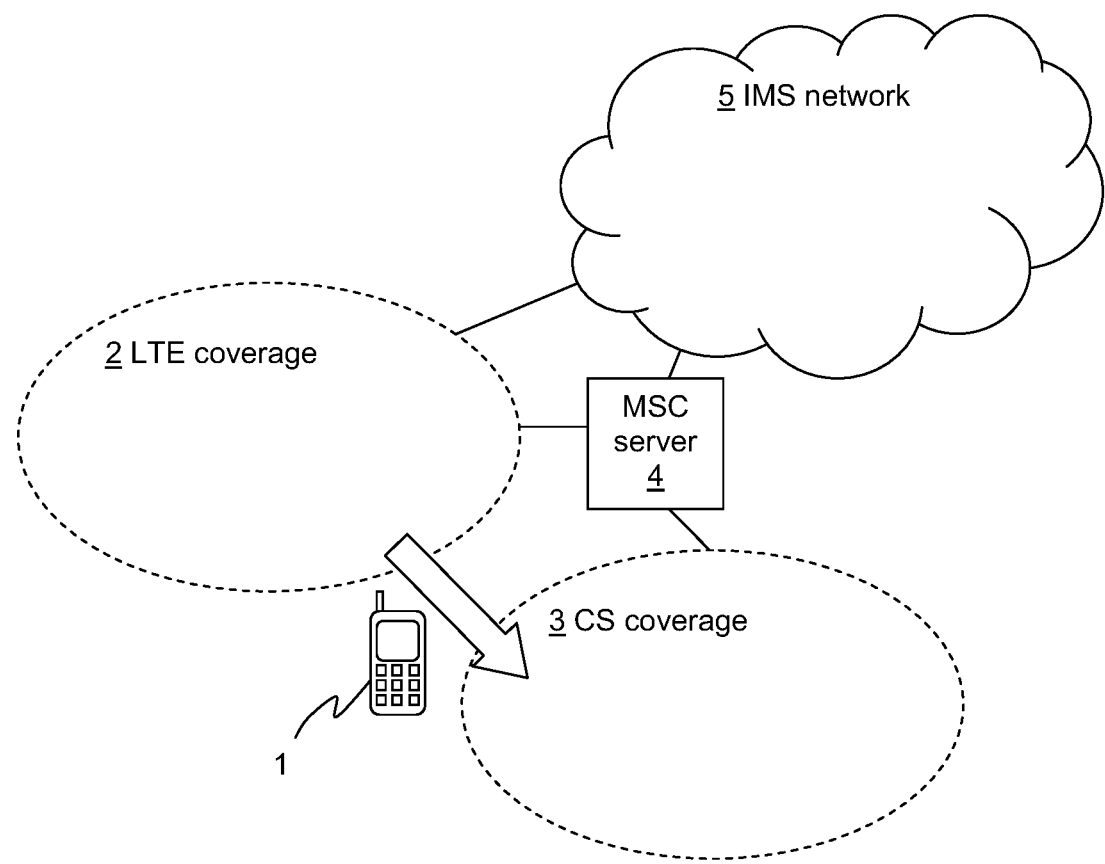
FIG. 1 illustrates schematically in a block diagram a handover from an LTE network to a legacy CS network.
Figure 2:
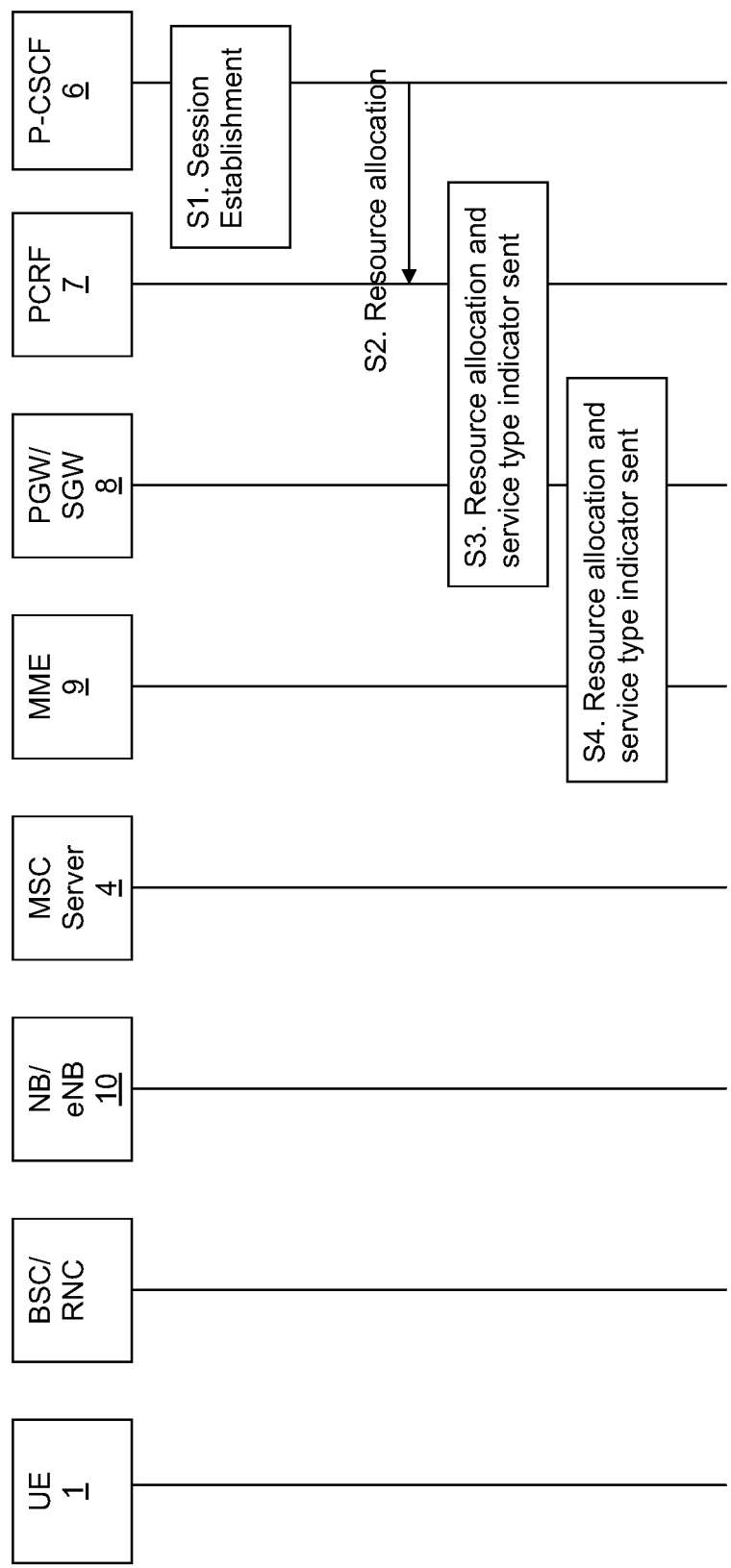
FIG. 2 is a signalling diagram illustrating procedures during call establishment in an LTE network.

Referring to FIG. 2 herein, when a UE 1 establishes a session (step S1) using an LTE network, a Proxy-Call Session Control Function (P-CSCF) 6 in the IMS network determines the type of service that is being used. Note also that step S1 can be performed in the event that a service type is changed during a session. For example, the same procedures apply when a voice call is upgraded to a video call.

In step S2, the P-CSCF communicates with a Policy Charging and Rules Function (PCRF) 7 to ensure that access resources are set up for the session. This includes setting up suitable bearers for the media being sent during the session. The P-CSCF 6 may also indicate to the PCRF 7 the service being used, for example by sending an IMS Communication Service Identifier (ICSI). As an extension, the P-CSCF may also indicate what type of service is being used, for example a speech call, or a video call. This gives the PCRF 7 more information in order that it can determine how to handle the session, without requiring the PCRF to understand which ICSI maps to which service type. Note that there may be more than one service may be available that can be used to establish a video call, and any of these services should be capable of being transferred if a session moves from a PS to a CS access network.

In step S3, the PCRF 7 initiates the setting up of relevant bearers for the session (e.g., a QCI=1 bearer for the speech part of the video call and a QCI=x bearer for the video part of the video call), by interacting with the PDN Gateway (PGW) or Serving gateway (SGW) 8. The PCRF 7 also indicates to the PGW/SGW 8 that the session is related to a video call by sending a service type indicator to the PGW/SGW 8 indicating the type of service, for example "service type=video call". Examples of types of service that may be indicated include speech call, video call, CS data, IMS priority call or fax.

Note that in the event that the PCRF 7 only received the communication service used from the P-CSCF 6, the PCRF 7 will need to use a local policy to map the communication service to the service type and determine the relevant service type indicator.

In step S4, The PGW/SGW 8 interacts with a Mobility Management Entity (MME) 9 during the bearer allocation, as the MME is involved in the bearer activation/deactivation process. The MME is also responsible for selecting the SGW 8 and authenticating the UE and user by interacting with a Home Subscriber Server (HSS) in the IMS network. The PGW/SGW 8 sends the service type indicator to the MME 9. As a result, and for a video call, the MME 9 considers the bearer related to QCI=1 and QCI=x to be related to the service type indicator. In other words, if the service type indicator indicates that the session is a video call, the MME 9 relates QCI=1 and QCI=x to the video call.

Figure 3:
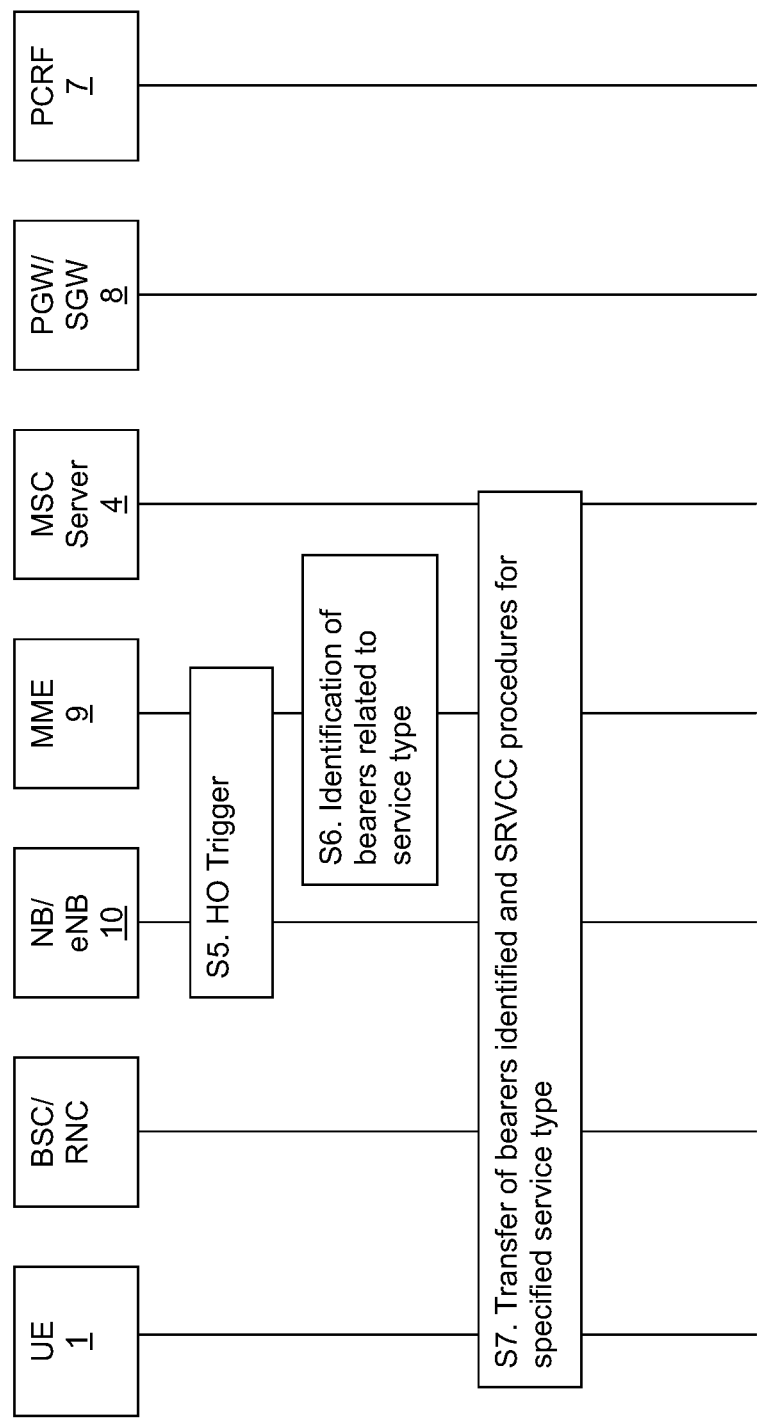
FIG. 3 is a signalling diagram illustrating procedures during handover of a UE from an LTE network to a CS network.

If there is no need to transfer the session between access networks for the duration of the session, then the service type indicator will not be used. However, if there is a need to transfer the session from the LTE network to a CS access network, then SRVCC is triggered, as illustrated in FIG. 3.

In step S5, an eNodeB 10 indicates to the MME 9 that the session is to be transferred to a CS network and that SRVCC is required.

In step S6, the MME 9 has knowledge of the service type indicator for the session subject to access transfer (for example, that it is a video call), and the bearers associated with the service type indicator. Therefore the MME 9 handles the QCI=x bearer (for the video part of the video call) in the same way as it handles the QCI=1 bearer for PS access transfer and for suspend/resume cases during SRVCC, as described in 3GPP TS 23.216 v9.4.0. In this way, the session is identified as relating to a video call, but there is no need to use QCI=2 as proposed in TR. 23.886 v.0.3.1 to identify the video part of the call, which allows operators more flexibility in assigning QCI values to video bearers.

In an optional embodiment, the MME 9 may decide not to execute the service type specific SRVCC procedures and instead execute only normal SRVCC. In this case, the MME 9 may still handle the QCI=x bearer in the same way as the QCI=1 bearer. This may occur where, for example, if a network operator does not wish to support the service type specific SRVCC procedures for this subscriber.

If configured to do so, the MME 9 indicates the type of service to the MSC Server 4 during the transfer. This may be done simply by forwarding the service type indicator to the MSC Server 4. This allows the MSC Server 4 to allocate resources for the video call or to invoke procedures specific to video calls. The MSC Server 4 performs the required actions and confirms to the MME 4 whether the service type specific SRVCC has been performed successfully, or whether only normal SRVCC has been performed. Normal SRVCC may be performed, for example, if the access used after the transfer does not support video call, e.g., GERAN.

In a further embodiment of the invention, as illustrated in step S7, the network (in other words, the MSC Server 4 and the MME 9) indicates towards the UE 1 that SRVCC procedures for the specific service type is being executed, and an indication of the bearers associated with the session. In situations in which the network may not be able to reliably execute video SRVCC, informing the UE 1 of the SRVCC procedures ensures that the UE 1 will not attempt to execute full video SRVCC procedures in a case where the network will not allow this. Such cases include, for example, local policies or a temporary lack of resources.

Figure 4:
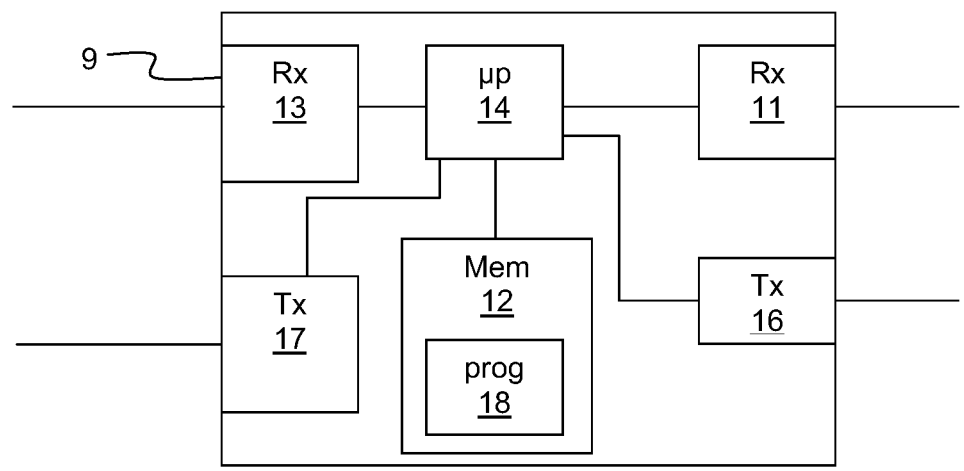
FIG. 4 illustrates schematically in a block diagram a Mobility Management Entity according to an embodiment of the invention.

Referring to FIG. 4, there is illustrated a MME 9. The MME 9 is provided with a first receiver 11 for receiving the service type indicator from the PGW/SGW 8. As described above, the service type indicator indicates the type of service being used in the session handled by the MME 9 and is associated with bearers used for the session. A computer readable medium in the form of a memory 12 is used to store the service type indicator. In the event of the session being transferred from one access type to another, a second receiver 13 receives (from the eNodeB 10) an indication that the session is to be transferred. A processor 14 is provided for determining the bearers associated with the session using the service type indicator, and initiating transfer of the session using those bearers.

The MME 9 may also be provided with a first transmitter 16 for communicating with the MSC Server 4 when it is required to send an indication of the type of service to the MSC Server in order to allow the MSC Server 4 to allocate resources or invoke special procedures A second transmitter 17 may also be provided for informing the UE 1 involved in the session that SRVCC for the type of service has been invoked and an indication of the bearers associated with the session.

The memory 12 may also be used to store a computer program 18 which, when run by the processor 14, causes the MME 9 to behave as described above.

Figure 5:
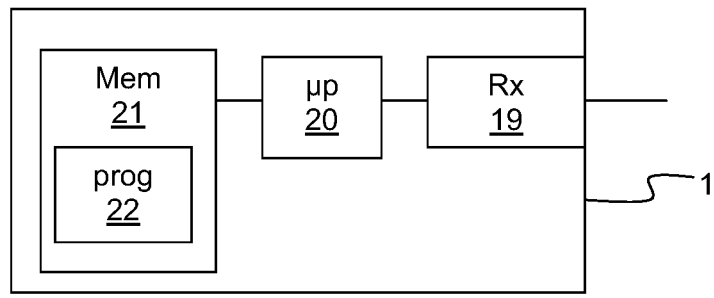
FIG. 5 illustrates schematically in a block diagram User Equipment according to an embodiment of the invention.

Turning now to FIG. 5, there is illustrated a UE 1. The UE 1 is provided with a receiver 19 for receiving a message relating to transfer of the ongoing session from the packet switched access network to a circuit switched access from the MME 9. The message includes an indication that SRVCC for the type of service has been invoked and an indication of the bearers associated with the session. A processor 20 is also provided for determining further action on the basis of the indication that SRVCC for the type of service has been invoked and the indication of the bearers associated with the session.

A computer readable medium in the form of a memory 21 may also be provided. This may be used to store a computer program 22 which, when run by the processor 20, cause the UE 1 to behave as described above.

Figure 6:
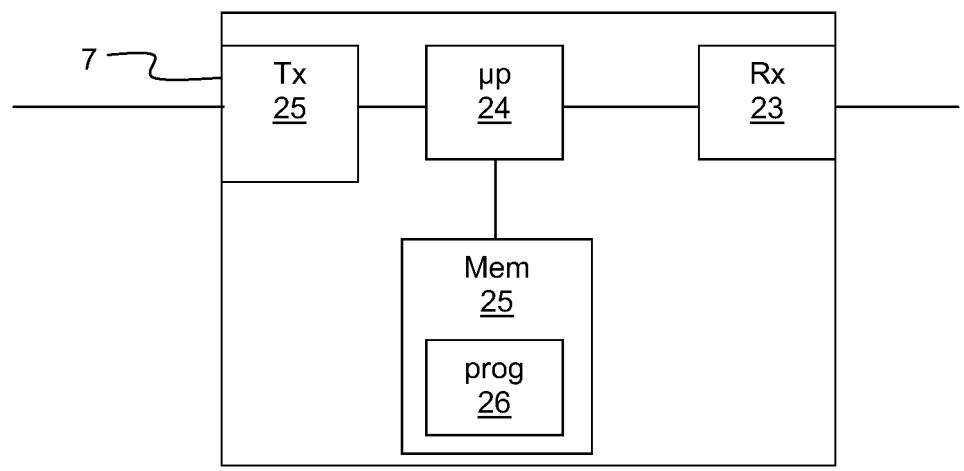
FIG. 6 illustrates schematically in a block diagram a Policy Charging and Rules Function node according to an embodiment of the invention.

FIG. 6 illustrates a PCRF 7. The PCRF 7 is provided with a receiver 23 for receiving from a P-CSCF 6 a message relating to setting up or upgrading of a session. As described above, the message includes an indication of a type of service used in the session. A processor 24 is provided for setting up or initializing bearers for the session and determining a service type indicator for use in a subsequent session transfer from a packet switched network to a circuit switched access network. This determination may either be a generation of the service type indicator or it may have been received from the P-CSCF 6. A transmitter 25 is provided for sending to the PGW/SGW 8 the service type indicator for subsequent forwarding to the MME 9.

A computer readable medium in the form of a memory 25 may also be provided. This may be used to store a computer program 26 which, when run by the processor 24, cause the PCRF 7 to behave as described above.

Figure 7:
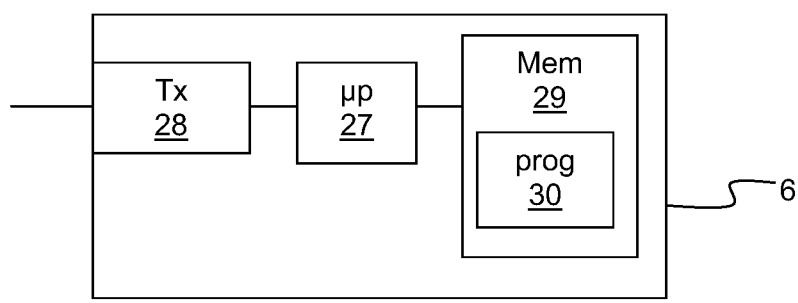
FIG. 7 illustrates schematically in a block diagram a Mobility Proxy-Call Session Control Function according to an embodiment of the invention.

Referring to FIG. 7, there is illustrated a P-CSCF 6, which is provided with a processor 29 for determining a type of service being used for a packet switched session. A transmitter 28 is provided for sending to a message to the PCRF 7, the message including an indication of the type of service being used.

A computer readable medium in the form of a memory 29 may also be provided. This may be used to store a computer program 30 which, when run by the processor 27, cause the P-CSCF 6 to behave as described above.

Figure 8:
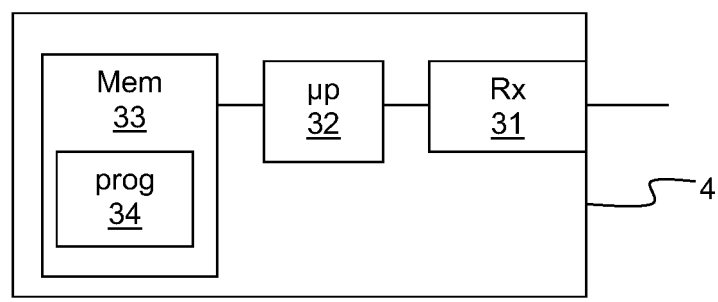
FIG. 8 illustrates schematically in a block diagram a Mobile Switching Centre Server according to an embodiment of the invention.

FIG. 8 illustrates a MSC Server 4, which is provided with a receiver 31 for receiving from an indication of a type of service being used for a session from the MME 9. A processor 32 is provided for, on the basis of the indication, allocating resources for the session and/or invoking procedures for the session.

A computer readable medium in the form of a memory 33 may also be provided. This may be used to store a computer program 34 which, when run by the processor 32, cause the MSC Server 4 to behave as described above.

By using the procedures described above, the correct bearers will be transferred during SRVCC procedures. Furthermore, a UE may use multiple bearers with same QCI value without risking that the "wrong" bearer is transferred during the transfer, or restricting the usage of bearer of one type to only one. The procedures described above also allow the network operator to decide on the QCI values used for video calls, which gives sufficient flexibility to allow different operators to use different QCI values for video, and also different QCI values for different subscribers.

It will be appreciated by the person of skill in the art that various modifications may be made to the above-described embodiments without departing from the scope of the present invention as described in the appended claims. For example, the above description refers to a LTE PS network, but the invention applies to other PS networks, for example a High Speed Packet Access (HSPA) network. Furthermore, the above description assumes that the type service used in the session is a video call. However, it will be appreciated that any type of service may be identified. Examples of such services include IMS priority calls, voice calls, CS data and fax messages.

The following abbreviations have been used in this specification:
3GPP 3rd Generation Partnership Project
BSC Base Station Controller
CS circuit switched
E-UTRAN Evolved Universal Terrestrial Radio Access Network
eNB eNodeB
HSPA High Speed Packet Access
ICSI IMS Communication Service Identifier
IMS IP Multimedia Subsystem
LTE Long Term Evolution
MME Mobility Management Entity
MSC Mobile Switching Centre
P-CSCF Proxy-Call Session Control Function
PCRF Policy Charging and Rules Function
PGW PDN Gateway
PS packet switched
RAN Radio Access Network
RNC Radio Network Controller
SAE System Architecture Evolution
SGW Serving Gateway
SIP Session Initiation Protocol
UE User Equipment
UTRAN UMTS Terrestrial Radio Access Network

The invention claimed is:

1. A method for setting up or upgrading a session in a communication network, the method comprising:
   receiving from a Call Session Control Function node a message relating to setting up or upgrading the session, the message including an indication of a type of service used in the session;
   setting up bearers for the session;
   generating a service type indicator for use in a subsequent session transfer from a packet switched network to a circuit switched access network; and
   sending to a gateway node the service type indicator for subsequent forwarding to a Mobility Management Entity.

2. The method of claim 1, wherein the method is performed by a Policy Charging and Rules Function node in a communication network.

3. The method of claim 1, wherein the service type indicator is associated with the bearers used for the session.

4. A method, comprising:
   determining a type of service being used for a packet switched session, wherein the type of service is one of following: a video call, a fax, and a Circuit Switched (CS) data service; and
   sending to a Policy Charging and Rules Function node a message, the message including an indication of the type of service being used, wherein the indication of the type of service being used is associated with bearers used for the packet switched session.

5. The method of claim 4, wherein the method is performed by a Proxy-Call Session Control Function node.

6. A method comprising:
   receiving from a Mobility Management Entity an indication of a type of service being used for a session, wherein the type of service is one of following: a video call, a fax, and a Circuit Switched (CS) data service, and wherein the session being transferred from a packet switched access network to a circuit switched access network; and
   on the basis of the indication, performing any of allocating resources for the session and invoking procedures for the session.

7. The method of claim 6, wherein the method is performed by a Mobile Switching Centre Server.

8. The method of claim 6, wherein after performing any of allocating resources for the session and invoking procedures for the session, confirming to the Mobility Management Entity whether a service type specific Single Radio Voice Call Continuity (SRVCC) has been successfully performed or whether a normal SRVCC was performed.

\* \* \* \* \*

UNITED STATES PATENT AND TRADEMARK OFFICE
CERTIFICATE OF CORRECTION

PATENT NO. : 10,716,033 B2  
APPLICATION NO. : 15/873569  
DATED : July 14, 2020  
INVENTOR(S) : Lindholm et al.

Page 1 of 1

It is certified that error appears in the above-identified patent and that said Letters Patent is hereby corrected as shown below:

On the Title Page

In Item (73), under "ASSIGNEE", in Column 1, Line 1, delete "TELEGONAKTIEBOLAGET" and insert -- TELEFONAKTIEBOLAGET --, therefor.

In the Specification

In Column 6, Line 5, delete "MME 4" and insert -- MME 9 --, therefor.

In Column 7, Line 13, delete "processor 29" and insert -- processor 27 --, therefor.

Signed and Sealed this  
Nineteenth Day of January, 2021

Andrei Iancu  
*Director of the United States Patent and Trademark Office*